United States Patent
Vitkala et al.

(10) Patent No.: US 6,427,488 B1
(45) Date of Patent: Aug. 6, 2002

(54) METHOD FOR HEATING GLASS SHEETS TO BE TEMPERED OR HEAT-STRENGTHENED

(75) Inventors: Jorma Vitkala; Jukka Vehmas, both of Tampere; Esko Lehto, Kangasala, all of (FI)

(73) Assignee: Tamglass Engineering Oy, Tampere (FI)

( * ) Notice: Subject to any disclaimer, the term of this patent is extended or adjusted under 35 U.S.C. 154(b) by 0 days.

(21) Appl. No.: 09/650,718

(22) Filed: Aug. 30, 2000

Related U.S. Application Data

(63) Continuation of application No. 08/575,309, filed on Dec. 20, 1995, now abandoned.

(30) Foreign Application Priority Data

Jan. 10, 1995 (FI) .................................................. 950107

(51) Int. Cl.[7] .............................................. C03B 18/18
(52) U.S. Cl. ........................ 65/29.19; 65/29.1; 65/111; 65/114; 65/119; 219/209
(58) Field of Search .............................. 65/29.1, 29.19, 65/111, 114, 119, 160, 163, 273, 274, 349, 350, 356, DIG. 4, 162; 219/209, 388, 391, 395, 400, 408, 409, 412, 482; 432/144, 145, 152, 199, 200

(56) References Cited

U.S. PATENT DOCUMENTS

| | | | |
|---|---|---|---|
| 2,999,768 A | | 9/1961 | Boresch |
| 3,326,654 A | | 6/1967 | Plumat |
| 3,652,246 A | * | 3/1972 | Michelotti et al. |
| 4,505,671 A | | 3/1985 | McMaster |
| 4,529,380 A | | 7/1985 | McMaster |
| 5,085,580 A | | 2/1992 | Reunamaki |
| 5,150,534 A | | 9/1992 | Kramer |
| 5,232,482 A | | 8/1993 | Laakso et al. |
| 5,236,488 A | * | 8/1993 | Vehmas |
| 5,437,704 A | | 8/1995 | Yli-Vakkuri et al. |
| 5,472,469 A | | 12/1995 | Yli-Vakkuri et al. |
| 5,672,191 A | * | 9/1997 | Kormanyos |

FOREIGN PATENT DOCUMENTS

| | | |
|---|---|---|
| AT | 399 335 | 9/1989 |
| EP | 0058529 | 8/1982 |
| WO | 9306052 | 4/1993 |

OTHER PUBLICATIONS

Geankoplis, Christie J., "Transport Processes and Unit Operations", 3rd Ed., 1993, p. 248.*
DUBBEL Taschenbuch für den Maschinenbau, 13th edition, vol. 1, pp. 468–474.
European Search Report.

* cited by examiner

Primary Examiner—Michael Colaianni
(74) Attorney, Agent, or Firm—Burns, Doane, Swecker & Mathis, L.L.P.

(57) ABSTRACT

The invention relates to a method for heating glass sheets to be tempered or heat-strengthened, in which method glass sheets are heated in a preheating furnace (1) by applying a hot-air blast and convection heating produced thereby to the opposite sides of a glass sheet and the preheated glass sheet is transferred from the preheating furnace (1) into a radiation heating furnace (2) for heating the glass sheet to a tempering temperature. During the convection heating of a glass sheet, the rotating speed of a hot-air fan (5) is increased while adjusting the heating effect of heating resistances (6) so as to maintain the temperature of blasted air substantially constant. Thus, the diminishing temperature difference between glass and air is compensated for by controlling the coefficient of heat transfer.

25 Claims, 1 Drawing Sheet

METHOD FOR HEATING GLASS SHEETS TO BE TEMPERED OR HEAT-STRENGTHENED

RELATED PATENT APPLICATIONS

This is a continuation patent application of U.S. application Ser. No. 08/575,309 filed Dec. 20, 1995 now abandoned also entitled METHOD FOR HEATING GLASS SHEETS TO BE TEMPERED OR HEAT-STRENGTHENED which claims priority to Finnish Patent Application No. 950107 filed Jan. 10, 1995; said applications in their entireties are hereby expressly incorporated by reference into the present application.

DESCRIPTION

1. Technical Field

The present invention relates to a method for heating glass sheets to be tempered or heat-strengthened, in which method glass sheets are heated in a preheating furnace by applying a hot-air blast and convection heating produced thereby to the opposite sides of a glass sheet and the preheated glass sheet is transferred from the preheating furnace into a radiation heating furnace for heating the glass sheet to a tempering temperature.

2. Background Art

In such prior known tempering furnaces, a drawback involved in preheating is that the heating efficiency deteriorates as the glass temperature rises. Thus, the preheating station is not capable of reaching a very high temperature or, alternatively, the heating time increases unacceptably.

In view of the above described deficiencies associated with the use of known methods for heating glass sheets to be tempered or heat-strengthened, the present invention has been developed to alleviate these drawbacks and provide further benefits to the user. These enhancements and benefits are described in greater detail hereinbelow with respect to several alternative embodiments of the present invention.

Disclosure Of The Invention

The present invention in its several disclosed embodiments alleviates the drawbacks described above with respect to conventional methods for heating glass sheets to be tempered or heat-strengthened and incorporates several additionally beneficial features.

An object of the invention is to improve this type of tempering method, such that the preheating can be intensified and expedited even though the air temperature is maintained substantially constant.

This object is achieved on the basis of the characterizing features set forth in the annexed claims 1 and 2.

BRIEF DESCRIPTION OF THE DRAWINGS

The invention will now be described in greater detail in the following way of example only and with reference to the attached drawings, in which.

MODE(S) FOR CARRYING OUT THE INVENTION

Figure 1:
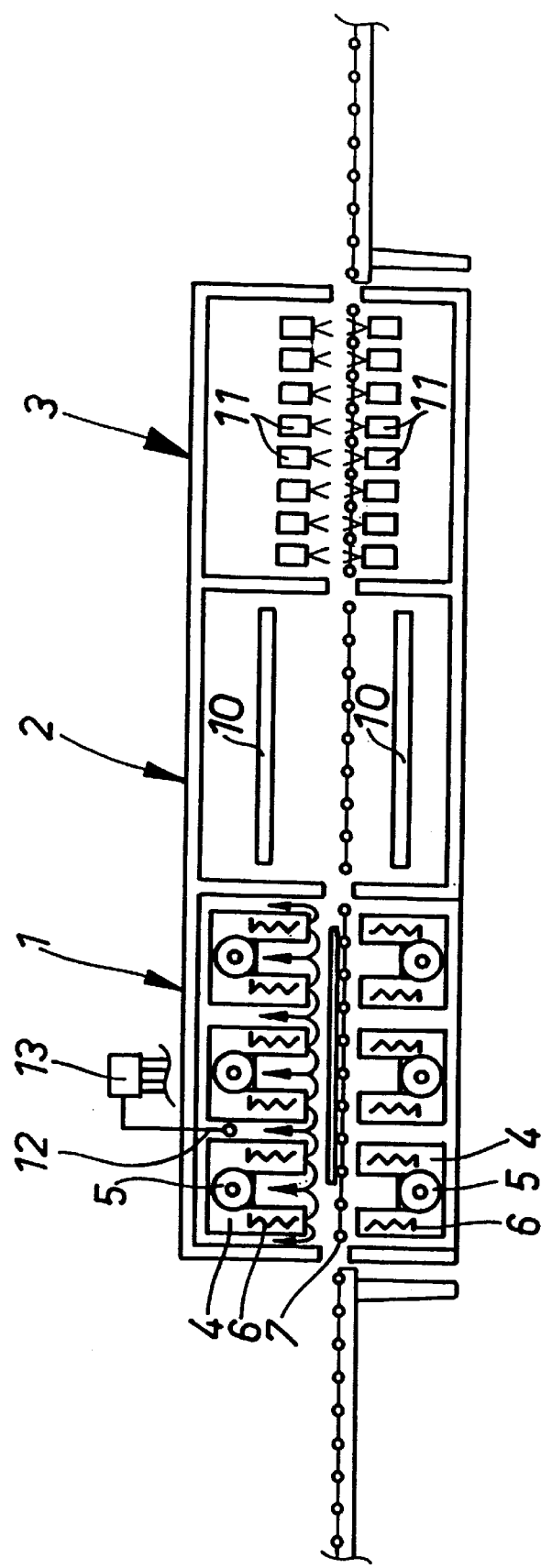
FIG. 1 is a schematic vertical section, showing a tempering furnace for implementing a method of the invention.
Figure 2:
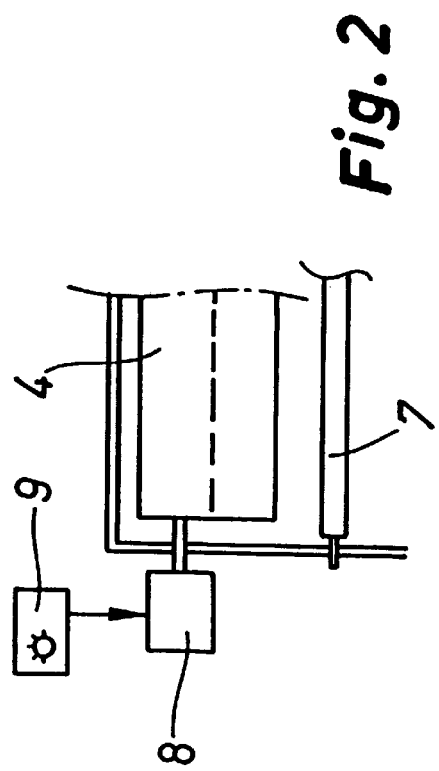
FIG. 2 shows schematically a detail in the preheating station of the furnace.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

The furnace comprises a preheating furnace 1 operating one convection heating principle, a radiation heating furnace 2, and a cooling station 3 for tempering or heat-strengthening. The radiation heating furnace 2 is provided with resistance elements 10 on either side of a roll conveyor or just above a roll conveyor. The chilling station 3 is provided with nozzle boxes 11 above and below a roll conveyor. The question may be about the tempering or heat-strengthening of flat glass or bent glass.

Above and below a conveyor consisting of rolls 7, the preheating furnace 1 includes nozzle boxes 4 which are fitted with fans 5 for circulating hot air between the furnace interior and nozzles located adjacent to the surface of a glass sheet. The nozzle boxes 4 are provided with heating resistances 6 between the fan 5 and nozzle orifices. A temperature sensor 12 measuring the air temperature of furnace 1 uses a control device 13 for regulating the power received by the resistances 6, such that the air temperature in the furnace remains substantially constant at a certain set value. The air temperature is maintained within a range of 400–500° C. preferably at about 450°C. This temperature is about 100° C. higher than in conventional preheating furnaces operating on the convection principle.

An essential feature in the invention is that the temperature difference between the glass and the furnace air diminishing upon the heating of glass is compensated for by controlling the coefficient of heat transfer of convection blast. According to the invention, this control of the coefficient of heat transfer is effected by increasing the rotating speed of fans 5 included in nozzle boxes 4 as the glass is heating. The rotating speed may increase to about 6-fold during the course of preheating.

The primary reason why the air temperature must be maintained constant is to prevent the heat expansion of furnace structures. The preheating must not involve at any stage too high a coefficient of heat transfer since the temperature difference between the core and the surface of glass must be maintained smaller than the temperature difference at which the glass breaks Typically, this temperature difference is less than 50° C. A method of the invention enables the maintenance of a coefficient of heat transfer throughout the preheating process at an optimally high level, such that it is not too high at the start and ineffectively low at the end.

An additional advantage gained by the invention is that, when preheating coated and reflecting glasses, the coefficients of heat transfer for both surfaces can be adjusted separately by adjusting separately the rotating speeds of hot-air fans blasting to the opposite surfaces of the glass so as to produce different coefficients of heat transfer for the opposite surfaces of the glass. The inverter operation of fan motors 8 controls automatically the rise of rotating speed, whereby a controller 9 can be used for setting the rotating-speed rising rates adapted to various glass thicknesses.

A methods for heating glass sheets to be tempered or heat-strengthened has been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is a follows:

1. A method for heating glass sheets to be tempered or heat strengthened comprising:

transporting a glass sheet into a preheating station;

preheating said glass sheet using convection warming by directing a heated air flow upon a surface of said glass sheet, said glass sheet having a first temperature when said glass sheet is first transported into said preheating station;

selecting a first air flow velocity at which said heated air flow is directed upon said surface of said glass sheet, said first air flow velocity selected to achieve optimized heat transfer from said heated air flow to said glass sheet and simultaneously avoid breakage of said glass sheet at said first temperature; and increasing said air flow velocity at which said heated air flow is directed upon said surface of said glass sheet as a temperature of said glass sheet escalates from said first temperature during said preheating process for increasing the efficiency of heat transfer into said glass sheet.

2. The method as recited in claim 1, wherein said transporting step further comprises:

conveying said glass sheet by roll conveyor.

3. The method as recited in claim 1, further comprising:

determining a program upon which said air flow velocity is increased during said preheating process based on a thickness of said glass sheet.

4. The method as recited in claim 1, further comprising:

directing a second heated air flow upon an opposite surface of said glass sheet; and increasing an air flow velocity at which said second heated air flow is directed upon said opposite surface of said glass sheet as said temperature of said glass sheet escalates from said first temperature during said preheating process for increasing the efficiency of heat transfer into said glass sheet.

5. The method as recited in claim 1, further comprising:

directing a second heated air flow upon a coated surface of said glass sheet; and increasing an air flow velocity at which said second heated air flow is directed upon said coated surface of said glass sheet as said temperature of said glass sheet escalates from said first temperature during said preheating process for increasing the efficiency of heat transfer into said glass sheet.

6. The method as recited in claim 1, further comprising:

preventing heat expansion of internal components of said preheating station by maintaining said preheating station at a substantially uniform temperature during said preheating process.

7. The method as recited in claim 1, further comprising:

heating said heated air flow using electric heating resistances.

8. The method as recited in claim 1, further comprising:

heating said glass sheet by radiation heat.

9. The method as recited in claim 8, wherein said step of heating said glass sheet by radiation heat is sequential to said preheating step using convection warming.

10. The method as recited in claim 8, wherein said step of heating said glass sheet by radiation heat tempers said glass sheet.

11. The method as recited in claim 1, further comprising:

controlling said heated air flow so that a temperature difference between a core of said glass sheet and said surface of said glass sheet is less than 50° C.

12. The method as recited in claim 1, further comprising:

heating said glass sheet to a tempering temperature using radiation heat.

13. The method as recited in claim 1, wherein said air flow velocity is at least doubled during said preheating process.

14. The method as recited in claim 1, wherein said air flow velocity is at least tripled during said preheating process.

15. The method as recited in claim 1, wherein said air flow velocity is at least quadrupled during said preheating process.

16. The method as recited in claim 1, wherein said air flow velocity is increased at least six-fold during said preheating process.

17. The method as recited in claim 1, wherein said air flow velocity is increased by increasing a rotational speed of at least one hot air fan driving said air flow velocity.

18. The method as recited in claim 1, wherein said increased air flow velocity causes an increased volume of heated air to be engaged upon said glass sheet during said preheating process thereby increasing the efficiency of heat transfer into said glass sheet during said preheating process.

19. The method as recited in claim 4, wherein said heated air flows are driven by a plurality of rotary fans, said fans being adapted to be separately adjustable for producing different coefficients of heat transfer at said surface and said opposite surface of said glass sheet.

20. The method as recited in claim 1, wherein said heated air flow is driven by a rotary fan at prescribed speeds by a fan motor, said fan motor being controlled by an inverter adapted to increase rotational speed of said fan motor according to a pre-set program, said pre-set program being dependent upon a thickness of said glass sheet.

21. A method for heating a glass sheet to a temperature suitable for tempering or heat strengthening in a furnace, said method comprising:

heating an air flow by conveying said air flow over electric resistances;

circulating said heated air flow with a fan rotating at a speed;

conveying a glass sheet to a position proximate said heated air flow for heating said glass sheet;

increasing said speed of rotation of said fan as a temperature of said glass sheet increases; and heating said glass sheet using radiation heat for heating said glass sheet to a tempering temperature.

22. The method as recited in claim 21, wherein said circulating heated air flow is maintained at a temperature between 400° C. and 500° C.

23. The method as recited in claim 22, wherein said circulating heated air flow is maintained at a temperature of approximately 450° C.

24. The method as recited in claim 21, wherein said fan is rotated by a fan motor, and said fan motor being controlled by an inverter adapted to increase rotational speed of said fan motor according to a pre-set program, said pre-set program being dependent upon a thickness of said glass sheet.

25. The method as recited in claim 21, wherein said heated air flow further comprises a plurality of heated air flows each being driven by a rotary fan, at least one of said plurality of heated air flows being directed upon a first surface of said glass sheet and at least one of said plurality of heated air flows being directed upon an opposite surface of said glass sheet; and each of said rotary fans being adapted to be separately adjustable for producing different coefficients of heat transfer at said first surface and said opposite surface of said glass sheet.

* * * * *